No. 784,542. PATENTED MAR. 14, 1905.
S. F. BOWSER.
HEATING DEVICE FOR STORAGE TANKS.
APPLICATION FILED MAY 5, 1904.
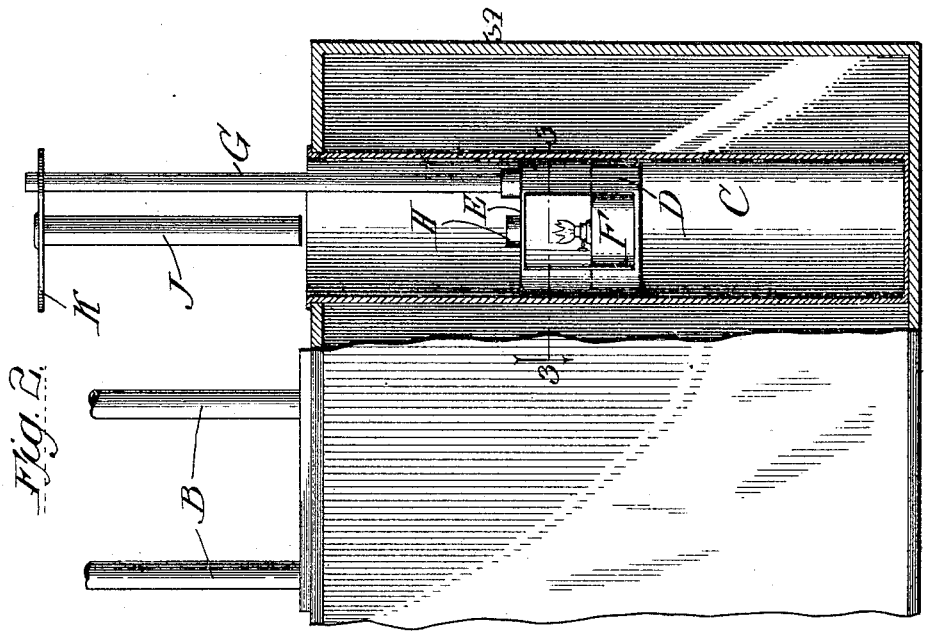
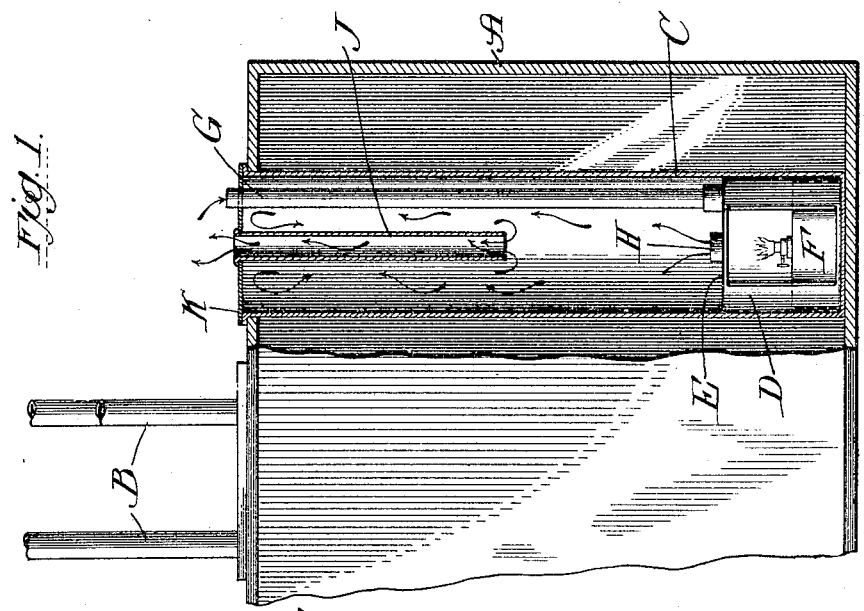
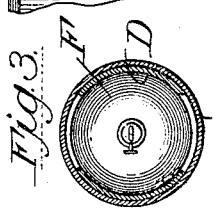
Witnesses:
Inventor:
Sylvanus F. Bowser
By Brown & Darby
Attys No. 784,542. Patented March 14, 1905.

UNITED STATES PATENT OFFICE.

SYLVANUS F. BOWSER, OF FORT WAYNE, INDIANA, ASSIGNOR TO S. F. BOWSER & COMPANY, INC., OF FORT WAYNE, INDIANA, A CORPORATION OF INDIANA.

HEATING DEVICE FOR STORAGE-TANKS.

SPECIFICATION forming part of Letters Patent No. 784,542, dated March 14, 1905.

Application filed May 5, 1904. Serial No. 206,465.

*To all whom it may concern:*

Be it known that I, SYLVANUS F. BOWSER, a citizen of the United States, residing at Fort Wayne, in the county of Allen and State of Indiana, have invented a new and useful Heating Device for Storage-Tanks, of which the following is a specification.

This invention relates to heating devices for storage-tanks.

The object of the invention is to provide means for preventing the contents of storage-tanks from becoming congealed in cold weather or in reduced temperatures to such an extent as to render the withdrawal of such contents from the tank impossible or inconvenient.

A further object of the invention is to provide means for maintaining sufficient fluidity of the contents of storage-tanks in cold weather as to enable such contents to be readily withdrawn from the tank by pump or otherwise for handling or use.

Other objects of the invention will appear more fully hereinafter.

The invention consists, substantially, in the construction, combination, location, and arrangement of parts, all as will be more fully hereinafter set forth, as shown in the accompanying drawings and finally pointed out in the appended claims.

Referring to the accompanying drawings and to the various views and reference-signs appearing thereon, Figure 1 is a view, partly in side elevation and partly in vertical section, of a storage-tank, showing a heating device embodying the principles of my invention applied thereto. Fig. 2 is a similar view to Fig. 1, showing the heating device embodying the principles of my invention as partially withdrawn from the storage-tank. Fig. 3 is a detail view, in transverse section, on the line 3 3 of Fig. 2 looking in the direction of the arrow.

The same part is designated by the same reference-sign wherever it occurs throughout the several views.

The contents of storage-tanks containing liquids or fluids—such as oil, lard, molasses, syrup, or the like—become hardened or congealed more or less in cold weather or in reduced temperatures, thereby rendering the withdrawal of such fluid or liquid from the storage-tank for use or dispensing purposes difficult, if not impossible. This is a difficulty, frequently encountered by merchants and others engaged in retail trade in withdrawing the fluid or liquid contents of storage-tanks in supplying their customers and also by housewives or others desiring to withdraw at intervals a portion only of the contents of a storage tank or receptacle.

It is among the special purposes of my present invention to provide means which are simple and efficient whereby the fluid or liquid contents of a storage tank, reservoir, or receptacle may be maintained in such a state of fluidity as will enable the same to be easily withdrawn from the tank, reservoir, or receptacle by means of a dispensing-pump or otherwise, as may be convenient, and as easily in cold weather or in reduced temperature as in warm weather. In the accomplishment of this object and purpose I propose to employ a heating device of simple construction and to arrange the same to be received within the storage tank or reservoir and constructed to generate sufficient heat which when radiated or conducted to the contents of the tank or reservoir will maintain the same in a sufficiently liquid or fluid state in cold weather as to enable the same to be readily withdrawn and to prevent the hardening or congealing thereof while retained in the storage tank or reservoir.

In the accompanying drawings I have shown a simple form and construction for accomplishing the desired objects and wherein reference-sign A designates a storage-tank or reservoir and which, if desired, may be provided with the usual pipes B for supplying or withdrawing the contents of such tank or reservoir therefrom.

Reference-sign C designates a chamber preferably, though not necessarily, cylindrical in shape and closed at the lower end thereof and open at the upper end thereof, which chamber is arranged to be set into the storage tank or reservoir A through a suitable opening in the top thereof, with the closed bottom of such chamber C resting upon the floor or bottom of the storage-tank, the upper end of such chamber C lying flush, or substantially so, with the top surface of the storage-tank, although in this respect I do not desire to be limited so long as the end of the chamber C projects through the top of the storage-tank. Arranged to be received within the chamber C is a carrier D, preferably, though not necessarily, in the form of an open-sided bracket or holder and having a closed diaphragm or top E. This bracket or holder is adapted to receive a heating device—such, for instance, as an ordinary oil-lamp F or other similar device. Connected to carrier or holder F is a tube G, open at both ends and of sufficient length for the upper open end thereof to project above the top of tank A or chamber C when the carrier D is resting upon the bottom of said chamber C, the other end of said open-ended tube G passing through the closed diaphragm E of the holder or carrier D and into the space occupied by the heating device F. This open-ended tube G serves the double purpose and function of a handle by which the carrier or holder D may be lowered into chamber C or removed therefrom and also as a flue or chimney for supplying air to the space occupied by the heating device or burner F, the cold air entering the upper open end of tube G being drawn into the space occupied by the burner or heating device F by the heat generated by such burner or heating device, thereby supplying air into such heating device to support and maintain combustion thereof. The diaphragm or closed top E of the holder or carrier D is provided with an opening therethrough (indicated at H) opening into the chamber C above the holder or carrier D and through which the air drawn into the space occupied by the burner or heater F through pipe G, after such air becomes heated, may pass into the chamber C, thereby heating such chamber C or the walls thereof, which heat is conducted or radiated from the walls of such chamber C to the contents of the tank, thereby heating the latter and maintaining the same in liquid or fluid state. This heated air after being delivered from the space occupied by the heater or burner F into chamber C may escape through the upper open end of said chamber to the outer air. If desired and in order to increase the efficiency of the heating action, I propose to employ a short section of open-ended pipe J and to project one of the open ends thereof downwardly into the chamber C, the upper end of said open-ended pipe-section J projecting through a top or cover plate K for the upper open end of chamber C, thereby forming, in effect, a chimney through which the heated air may pass from chamber C to the outer air, as indicated by the arrows in Fig. 1. By this arrangement it will be seen that the fresh or cold outer air is drawn through the pipe G into the space occupied by the heating device or burner F, where it becomes heated and passes through the opening H into the upper part of chamber C, rising to the top of said chamber when the closed top cover K is employed and circling around the exit-pipe J, thereby heating such pipe and also the walls of chamber C and finally escaping through said exit-pipe J to the outer air. The heating device may be readily removed at any time for replenishing the supply of oil to the lamp in case a lamp is used or for replacing the candle in case a candle is employed as the heating device or burner by simply withdrawing the holder or carrier D, as indicated in Fig. 2.

From the foregoing description it will be seen that I provide an exceedingly simple and efficient heating device for storage-tanks which occupies small space, which is entirely removed from danger of igniting the contents of the tank, which is inexpensive to maintain, and by the use of which the fluid or liquid contents of a storage tank or reservoir may be maintained in liquid or fluid state even in the most extremely cold weather, thereby enabling the contents of the storage-tank to be withdrawn by pump or otherwise for dispensing or for use. I have found that a very small blaze—such as would be maintained by an oil-lamp, for instance, or a candle—will keep or maintain the contents of a storage-tank in a fluid or liquid state, thereby enabling the dispensing-pump to handle the contents of such tank in withdrawing the same for use as easily in the coldest weather, without loss of the contents of the tank and without loss of time and labor, as in warm weather.

It is obvious that a storage-tank-heating device such as above described while specially designed and intended for maintaining the liquid contents of the storage-tank in a fluid or liquid state in cold weather is equally well adapted for use for other purposes or in any case where it is desirable to maintain the contents of a storage tank or reservoir or the interior of a chamber or casing at a desirable or uniform temperature.

Having now set forth the object and nature of my invention and a construction embodying the principles thereof, what I claim as new and useful and of my own invention, and desire to secure by Letters Patent, is—

1. The combination with a storage-tank having a chamber, said chamber being closed at one end and opening to the outer air at the other end, a heating device arranged within said chamber and comprising a carrier or holder having a closed top or diaphragm, and a lamp or other burner carried thereby below said diaphragm or top, and an air-supply pipe communicating with the outer air and to the space occupied by said lamp or burner.

2. The combination with a storage-tank having a closed chamber therein, a heating device arranged to be received within said chamber and comprising a carrier or holder, a lamp or burner carried by said holder, said carrier or holder having a closed top or diaphragm, an opening through said top or diaphragm delivering into said chamber and an air-supply pipe communicating with the outer air and passing through said top or diaphragm and delivering into the space occupied by said burner or lamp.

3. The combination with a storage-tank having a closed chamber therein, of a carrier or holder arranged to be received in said closed chamber, a lamp or burner carried by said holder, said carrier or holder having a closed top or diaphragm, said top or diaphragm having an opening therethrough forming a communication between the space occupied by the lamp or burner and the chamber, an air-supply pipe communicating with the outer air and delivering through said diaphragm or top into the space occupied by said burner or lamp, a top for said chamber, and an open-ended pipe projecting through said top and into said chamber.

In witness whereof I have hereunto set my hand, this 22d day of May, 1904, in the presence of the subscribing witnesses.

SYLVANUS F. BOWSER.

Witnesses:
C. H. SEEM,
S. E. DARBY.